US006985493B1

(12) United States Patent
Roumas

(10) Patent No.: US 6,985,493 B1
(45) Date of Patent: Jan. 10, 2006

(54) MESSAGE AGGREGATOR FOR CHANNELIZED INTERFACE PROGRAMMING

(75) Inventor: John Roumas, Leominster, MA (US)

(73) Assignee: Cisco Technology, Inc., San Jose, CA (US)

( * ) Notice: Subject to any disclaimer, the term of this patent is extended or adjusted under 35 U.S.C. 154(b) by 938 days.

(21) Appl. No.: 09/791,251

(22) Filed: Feb. 23, 2001

(51) Int. Cl.
*H04J 3/16* (2006.01)

(52) U.S. Cl. .................. 370/465; 370/392; 370/466
(58) Field of Classification Search ............ 370/351, 370/352, 389, 391, 392, 395.31, 395.72, 370/400, 401, 404, 405, 406, 419, 420, 465, 370/466, 467, 469
See application file for complete search history.

(56) References Cited

U.S. PATENT DOCUMENTS

| 5,133,070 A | 7/1992 | Barker et al. |
| 6,771,673 B1 * | 8/2004 | Baum et al. ............... 370/535 |
| 2002/0118682 A1 * | 8/2002 | Choe ....................... 370/395.31 |

OTHER PUBLICATIONS

U.S. Appl. No. 09/792,249, McRae et al.
U.S. Appl. No. 09/145,600, filed Sep. 2, 1998, Gai et al.
U.S. Appl. No. 09/535,810, filed Mar. 28, 2000, Gai et al.

* cited by examiner

*Primary Examiner*—Phirin Sam
(74) *Attorney, Agent, or Firm*—Cesari and McKenna, LLP

(57) ABSTRACT

A message aggregation technique converts procedural instructions to object-based format for efficient transfer from a route processor to line cards of an intermediate node, such as an aggregation router. The message technique applies to any situation where it is desirable to reduce a large number of fine resolution command messages, e.g., instructions for programming interfaces on the line cards, transferred by the route processor over a communications medium to the line cards. In addition, the technique permits reuse of extant procedural code while condensing the resultant line card programming messages.

21 Claims, 9 Drawing Sheets

MESSAGE AGGREGATOR FOR CHANNELIZED INTERFACE PROGRAMMING

CROSS-REFERENCE TO RELATED APPLICATIONS

The present invention is related to the following co-pending and commonly assigned U.S. patent application Ser. No. 09/792,249, now issued as U.S. Pat. No. 6,785,843 titled, Data Plane Restart Without State Change in a Control Plane of an Intermediate Network Node, which was filed on even date herewith and assigned to the assignee of the present invention.

FIELD OF THE INVENTION

The present invention relates to intermediate nodes of a communications network and, in particular, to the software architecture of an intermediate node, such as an aggregation router, used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate node or device, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router is an access router configured to provide high quality of service and guaranteed bandwidth for both data and voice traffic destined for the Internet. The aggregation router also provides a high degree of security for such traffic. These functions are considered "high-touch" features that necessitate substantial processing of the traffic by the router. More notably, the aggregation router is configured to accommodate increased density by aggregating a large number of leased lines from ISP subscribers onto a few trunk lines coupled to an Internet backbone.

In addition to deployment at a POP, the aggregation router may be deployed in a telephone company central office. The large numbers of subscribers connected to input interface ports of the router are typically small to medium sized businesses that conduct a substantial portion of their operations "on-line", e.g., over the Internet. Each of these subscribers may connect to the aggregation router over a high reliability link connection that is typically leased from, e.g., a telephone company provider. The subscriber traffic received at the input interfaces is funneled onto at least one trunk interface. That is, the aggregation router essentially functions as a large "fan-in" device wherein a plurality (e.g., thousands) of relatively low-speed subscriber input links is aggregated onto a single, high-speed output trunk to a backbone network of the Internet.

Broadly stated, each input link may comprise a T1 or T3 connection, whereas the output trunk interface connection may comprise an OC-12 connection. A T1 connection has a data rate of 1.5 megabits per seconds (Mbps) and there are preferably 28 T1s to each T3 connection; a T3 connection thus has an effective data rate of approximately 42 Mbps. On the other hand, the effective data rate of an OC-12 trunk interface connection is typically 622 Mbps. As noted, the aggregation router receives a plurality of subscriber inputs (e.g., 1000 T1 lines) and aggregates them onto a single output trunk (e.g., an OC-12 link). However, not all T1 links are constantly in use and, through the use of statistical multiplexing, the number of input subscriber lines that can be disposed over a single output trunk at one time can be determined. For example, although the effective data input rate of 1000 T1 lines is greater than 1 gigabit per second (Gbps), the subset of T1 lines that is constantly in use (e.g., approximately 400 T1 lines) may be supported over a single 622 Mbps link (OC-12).

As routers become larger in terms of bandwidth and number of supported interfaces, scalability becomes a main issue. In general, it is desirable to reuse extant software code that has been designed and targeted to a relatively small number of configurable interfaces of the routers for newer product development. However, the advent of large-scale, channelized interfaces creates a number of problems, primarily because of the vast number of channels that can be created as virtual interfaces over a single physical connection. Channelized T3 (CT3) is an example of a line card having such interfaces.

Specifically, each T3 port of a CT3 line card can be configured into 28 T1s and each T1 can be configured into 24 DS0 channels, for a maximum 672 interfaces per port, although this number can be limited by the number of channels supported by the router hardware. The aggregation router described herein, with an anticipated 16 CT3 line cards, each with 6 ports, can result in a substantial number of interfaces to be programmed, even with a hardware-based constraint of only 128 channels per port. This results in a possible 12,288 CT3 channel interfaces on a single router chassis. If the hardware constraint is removed, the number of channel interfaces increases to 64,512.

Not only must each interface be programmed for a number of separate operational parameters, but those interfaces at higher levels, (e.g., T1 and T3) also require programming of individual parameters. Thus, in a worst-case scenario, such as system start up on a fully loaded router chassis, a supervisor processor (e.g., a route processor) may send (download) several hundred thousand separate programming directives to its line cards. The results of such substantial download operations may range from unacceptable start up times to system crashes due to resource depletion. As a result, a technique is needed to reduce down the number of messages containing programming instructions that are downloaded to the line cards.

Reducing the number of messages needed to program line cards of a router is not generally a problem associated with previous routers because many of those routers typically do not handle such a large number of diverse interfaces/ports. However, an example of a line card having a large number of interfaces with potentially many different parameter settings is the CT3 line card of the 7200 Series router available from Cisco Systems, Inc. The software code used to program the CT3 line card is proven and may be utilized with the present invention. Yet, the methods used to employ this code when programming line cards (i.e., port adapters) on the 7200 router do not scale for certain routers, such as the aggregation router used with the present invention. This is primarily because the 7200 router supports a smaller number of CT3 interfaces than those supported by the aggregation router described herein.

Specifically, use of the previous programming methods by the aggregation router would result in a substantial number (e.g., tens of thousands) of individual messages being sent over a communications transport medium during various procedures of the router. These procedures include a start-up process and/or programming of a "bare" router using individual command line interpreter commands organized within a script. Use of a script to download commands from the route processor to the line cards of the aggregation router would further result in a substantial amount of information being transported essentially simultaneously over the communications medium.

The aggregation router cannot handle such large amounts of information using existing methods primarily because of the arbitrary number of messages that are down-loaded for each interface. For example, there may be 10–20 different parameters that require programming for each interface; the existing methods specify sending separate commands over the transport medium for each parameter. For an aggregation router having a large-scale interface arrangement (e.g., 12,288–64,512 CT3 channel interfaces), use of the existing methods would adversely impact performance of the router, including possibly "crashing" the route processor. Even in the absence of such an egregious event, processing and transporting of these large amounts of individual messages are expensive in terms of consumption of resources. Therefore, the present invention is directed to a technique that reduces ("scales down") the number of messages containing programming instructions that are sent to the line cards of a router.

SUMMARY OF THE INVENTION

The present invention comprises a system and technique for converting procedural instructions on a router processor to object-based format for efficient transfer to line cards of an intermediate node, such as an aggregation router. The inventive technique, referred to as message aggregation, may apply to any situation where it is desirable to reduce a large number of fine resolution command messages, e.g., instructions for programming interfaces/ports on the line cards, transferred by the route processor over a communications medium to the line cards. In addition, the inventive technique permits reuse of extant procedural code while condensing the resultant line card programming messages.

According to the invention, the message aggregator "aggregates" programming instructions associated with the procedural code into data objects for transmission to the line cards. Reuse of extant code is permitted by enabling the message aggregator to interface with driver application code in the same manner as conventional line card programming calls. However, instead of the number of messages being the same as the number of programming calls, the number of messages equals the number of objects being programmed. As a result, the message aggregator functions as a procedure-to-object translator that translates procedural code into parameters of data objects that are then efficiently distributed to the appropriate line cards.

In the illustrative embodiment, the line cards include a channelized T3 (CT3) line card having extant and proven procedural programming code. In the case of such a CT3 line card, an object may comprise a T3, T1 or a channel interface. According to a first stage of message aggregation, the number of potential messages transmitted to the line card when programming an object type (such as e.g., a channel) is reduced to one from the number of individual parameters associated with that channel. This aspect of the inventive technique may be extended to reduce the number of possible line card programming messages to the number of objects defined for the aggregation router. The addition of further parameters (i.e., commands) against these objects results in no increase in the number of messages nor in their size, just a modification to the parameter "data package" that is transported to the line cards. This, in turn, represents a substantial and efficient feature of the present invention.

Moreover, a second stage of message aggregation is provided by which a maximum message size of an interprocess communication (IPC) mechanism is employed to gather commands/parameters for each object type. For example, assume commands have been issued against a number of channels following a programming sequence from a particular source, such as a command line interpreter, a start up procedure or an online removal/insertion procedure. The mechanism operates to organize ("pack") as many of these commands, in contiguous order based, e.g., on standard slot/port/channel number, as will fit into one IPC message. This stage of the inventive technique results in a further substantial decrease (e.g., of one or two orders of magnitude) in the number of IPC messages actually transmitted to the line cards.

Although programming by object is not new, the inventive technique described herein represents a powerful scaling tool for enabling the use of object-state programming by conventionally extant, procedural operating system code that is not originally designed for its use. The present invention thus advantageously enables scaling of previously unmanageable numbers of interfaces on routers by significantly limiting the number of line card programming IPC messages that must be processed. The message aggregation technique also substantially reduces start up times as compared to those resulting from linear techniques currently in use. Moreover, the inventive technique is sufficiently generic to be applied to any platform or line card type that requires interface scaling, such as a channelized OC-12 line card used in an aggregation router.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
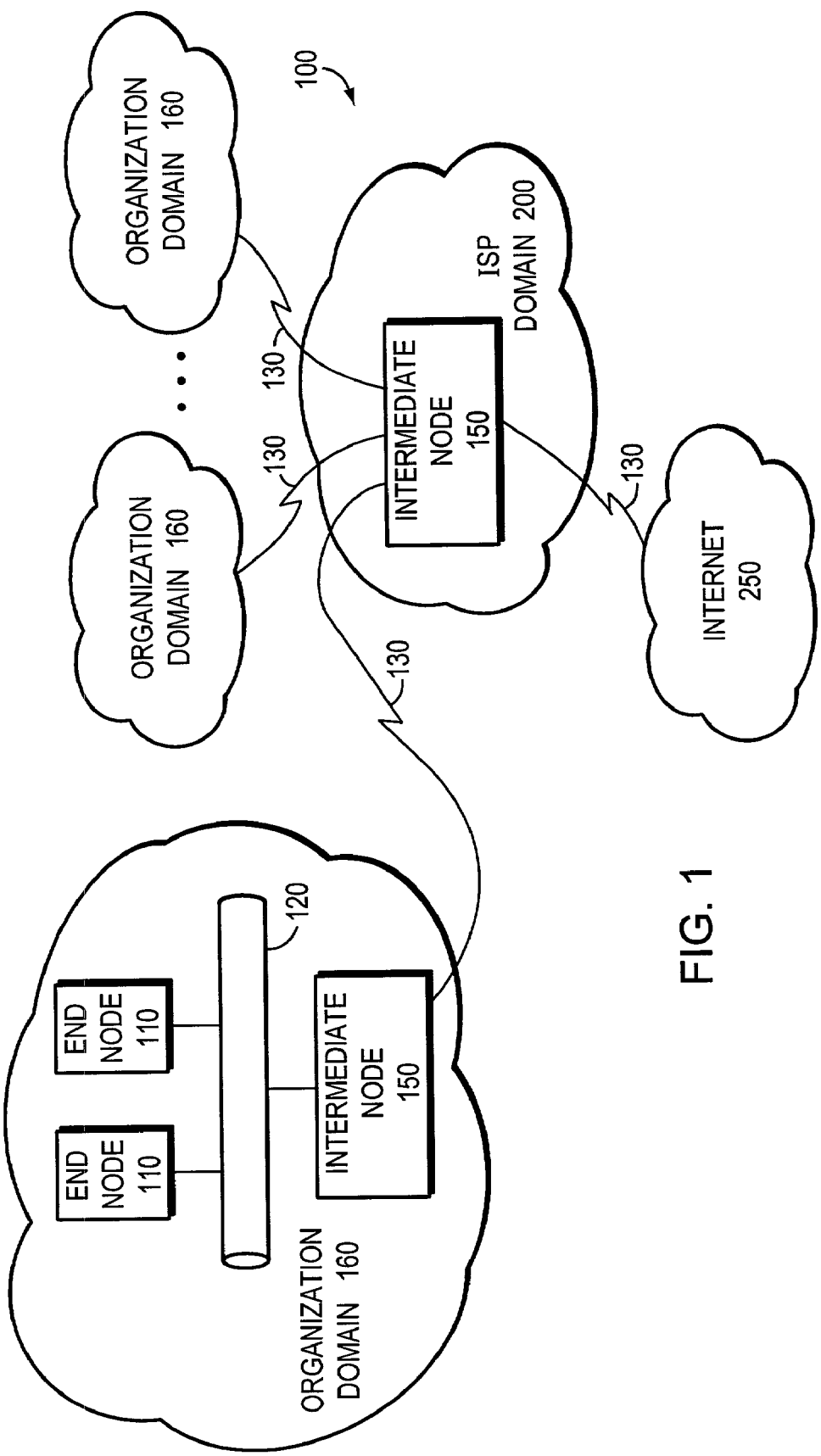
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
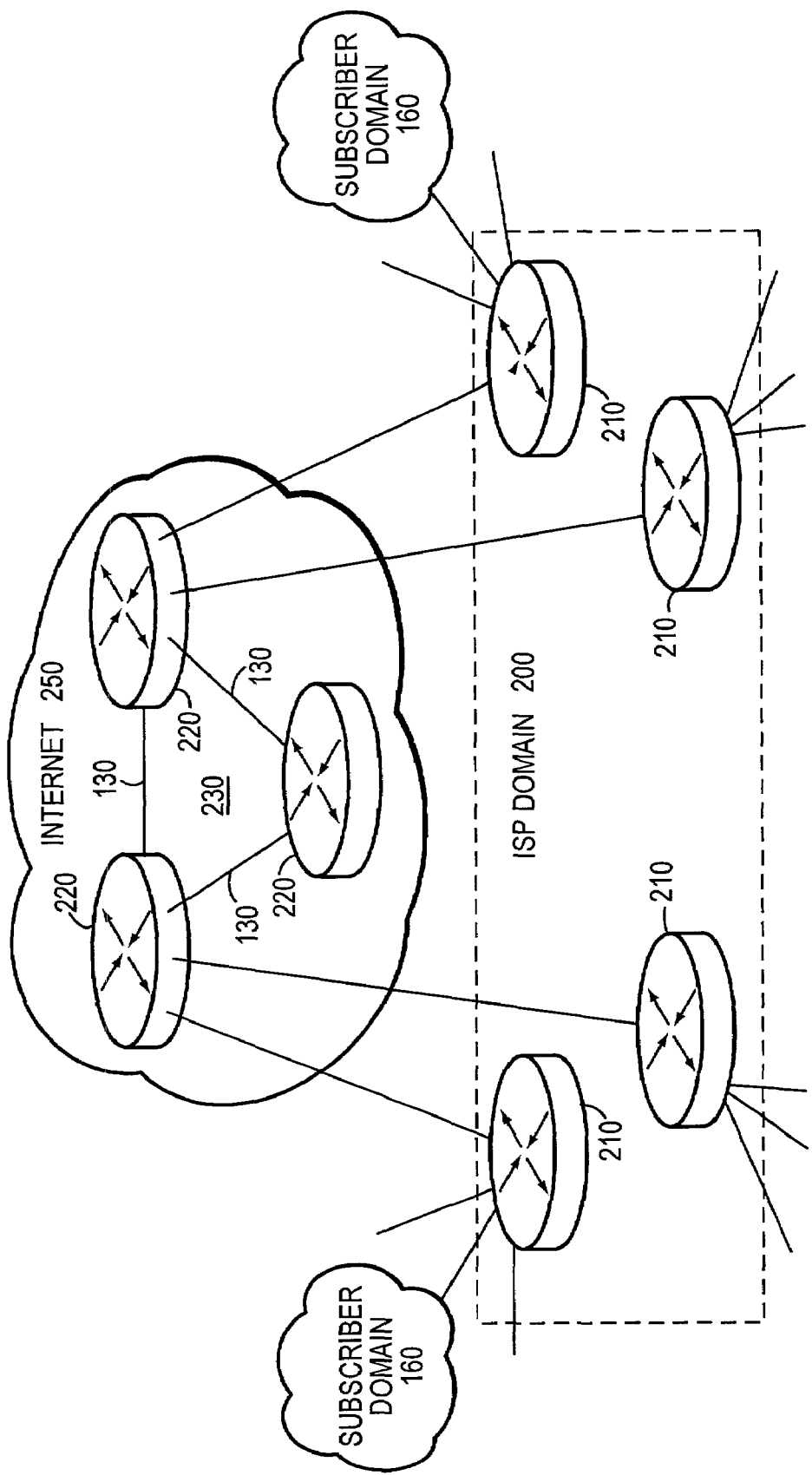
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
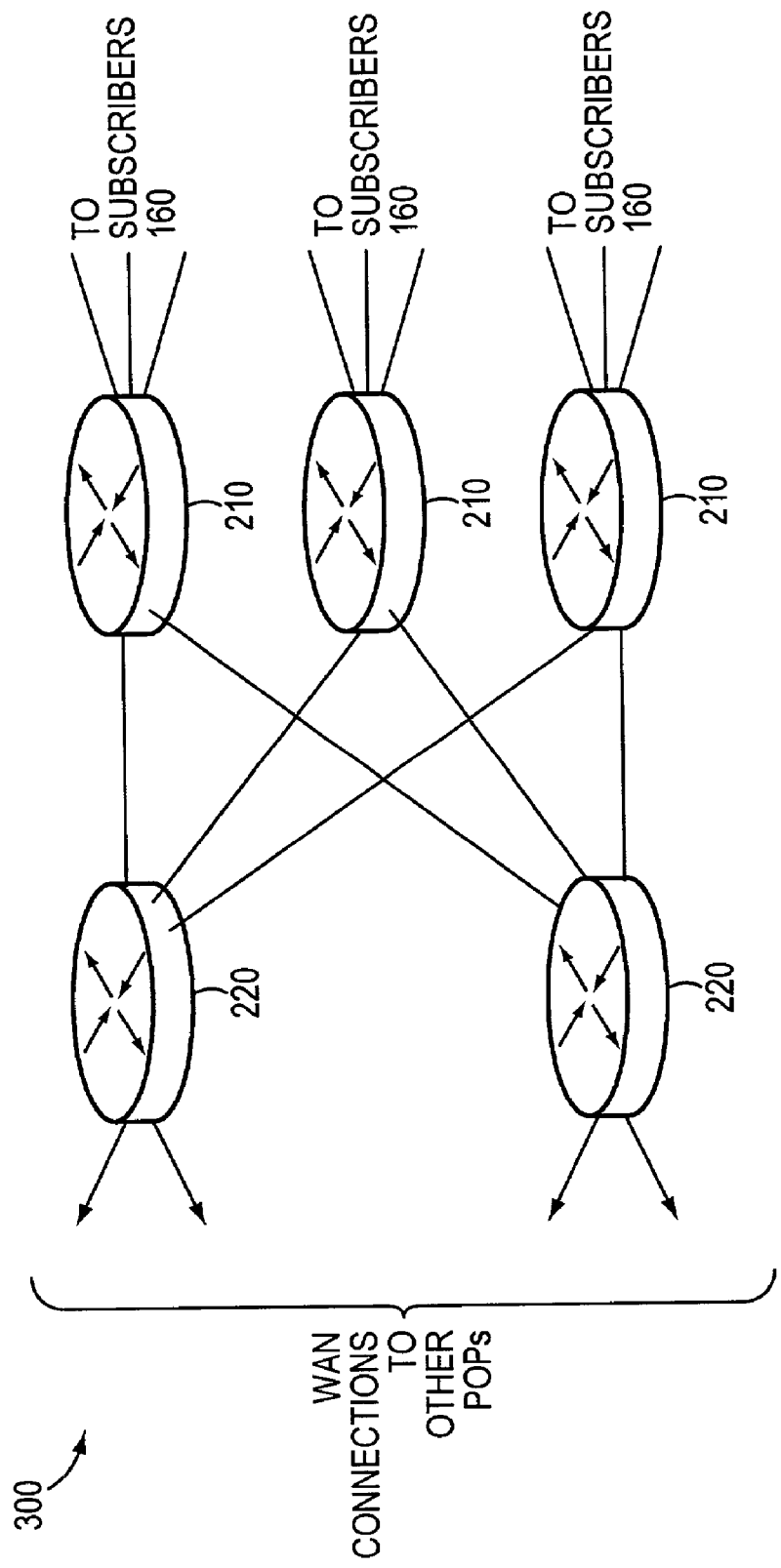
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 4:
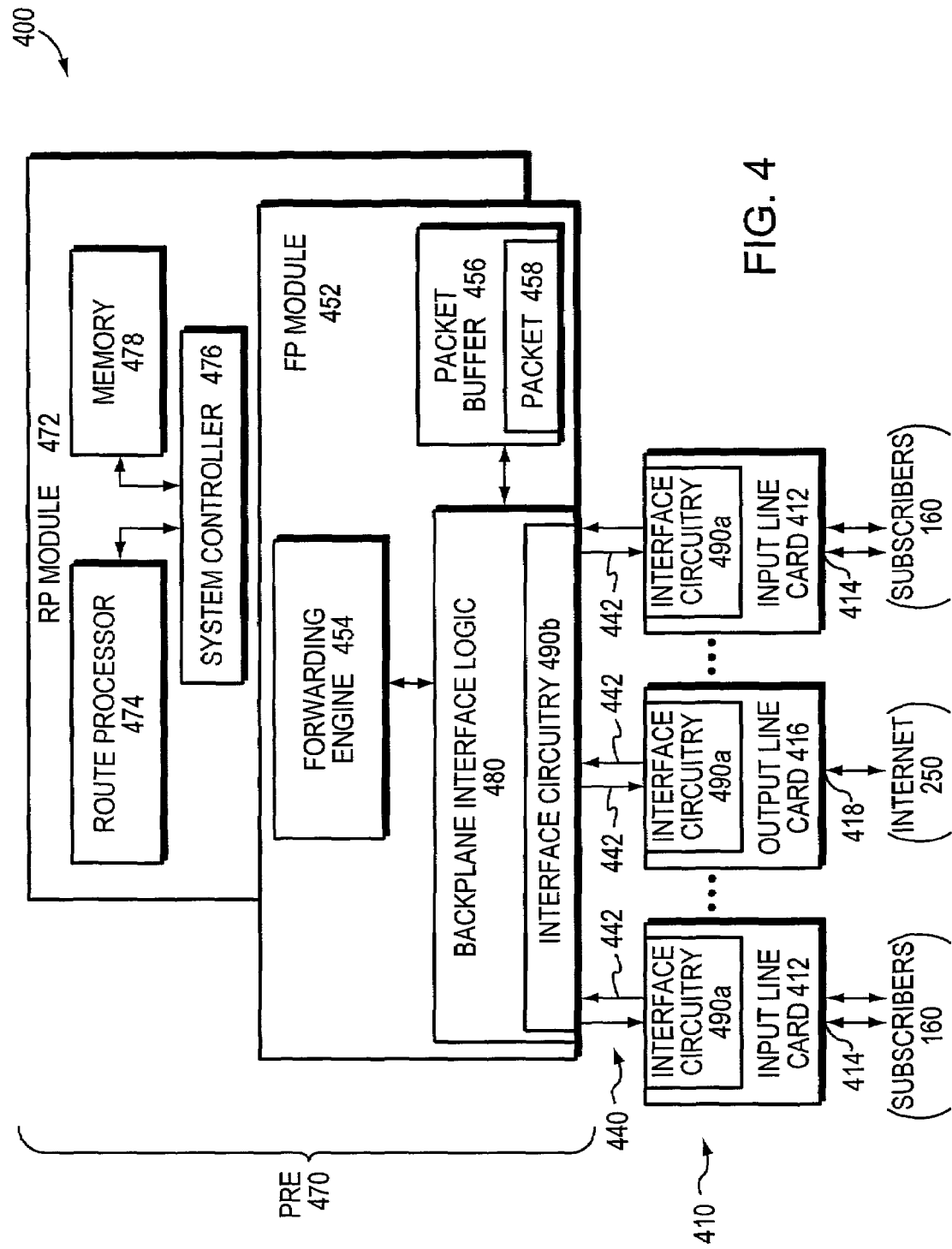
FIG. 4 is a schematic block diagram of an aggregation router that may be advantageously used with the present invention.

FIG. 4 is a schematic block diagram of an aggregation router that may be advantageously used with the present invention. The aggregation router comprises a plurality of line cards 410 coupled to at least one performance routing engine (PRE 470) via a unidirectional (i.e., point-to-point) interconnect system 440. The line cards 410 include a plurality of input cards 412 having input ports 414 coupled to subscribers 160 and at least one output "trunk" card 416 configured to aggregate the subscriber inputs over at least one output port 418. The PRE 470 is an assembly comprising a fast packet "forwarding" processor (FP) module 452 and a route processor (RP) module 472 adapted to perform packet forwarding and routing operations, respectively. The PRE assembly also provides quality of service (QoS) functions for complete packets received from each input line card over the interconnect system. To that end, the interconnect system 440 comprises a plurality of high-speed unidirectional links 442 coupling the PRE to each line card 410.

The RP module 472 is a processor-based, routing system suite comprising functionality incorporated within a typical router. That is, the RP module comprises a general-purpose processor 474 (e.g., a MIPS route processor) coupled to a system controller 476 and memory 478. The memory 478 comprises synchronous dynamic random access memory (SDRAM) storage locations addressable by the processor 474 for storing soft-ware programs and data structures accessed by the components. A network routing operating system, portions of which are typically resident in memory and executed by the route processor, functionally organizes the router by, inter alia, invoking network operations in support of software processes executing on the router. The route processor 474 is configured to construct and load routing tables used by the FP module 452. The processor 474 also performs configuration management functions of the aggregation router 400 and communicates with neighboring peer routers to exchange protocol data units used to construct the routing tables in accordance with conventional routing algorithms. It will be apparent to those skilled in the art that other memory means, including various computer readable media, may be used for storing and executing program instructions pertaining to the operation of the router.

The FP module 452 is responsible for rendering forwarding decisions for the aggregation router and, to that end, includes a forwarding engine 454 (such as an arrayed processing engine) coupled to a high-performance backplane interface logic circuit 480. The forwarding engine 454 is preferably embodied as two high performance, application specific integrated circuits (ASICs) having a plurality of processors arrayed as four (4) rows and eight (8) columns in a 4×8 arrayed configuration, wherein each column is coupled to a memory. However, it will be understood to those skilled in the art that other arrayed configurations, such as an 8×2 or 8×8 array, may be used in accordance with the present invention. The forwarding engine 454 essentially comprises the entire forwarding path functionality of the aggregator.

Interface circuitry 490 coupled to the ends of the unidirectional links 442 is resident on both the line cards 410 and the backplane logic circuit 480. The backplane logic circuit 480 is also preferably embodied as a high performance ASIC, hereinafter referred to as the Cobalt ASIC, which is configured to further interface the line cards to a packet buffer 456 of the FP module. The packet buffer 456 is a memory used to store packets 458 as the forwarding engine 454 determines where and when they should be forwarded within the aggregation router. For example, the packet buffer may be used to store low priority data packets while high priority, low latency voice packets are prioritized by the forwarding engine to an output card (e.g., the trunk card 416) of the aggregation router. An example of a backplane logic circuit that may be advantageously used with the present invention is disclosed in co-pending and commonly-owned U.S. patent application Ser. No. 09/791,063 titled High Performance Interface Logic Architecture of an Intermediate Network Node, which application is hereby incorporated by reference as though fully set forth herein.

The aggregation router 400 illustratively includes sixteen (16) line cards 410, each of which may be configured for an OC-12 (622 Mbps) data rate. Thus, the point-to-point links 442 coupled to the line cards must be capable of supporting such data rates. As described herein, an interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. 09/791,062 titled High Performance Protocol for an Interconnect System of an Intermediate Network Node, which application is hereby incorporated by reference as though fully set forth herein.

The interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the aggregation router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line cards 410 to a novel protocol format for transmission from, e.g., the Barium ASIC over the interconnect system 440 to the Cobalt ASIC. The ASICs also include circuitry to perform cyclic redundancy code (CRC) generation and checking on packets, along with interconnect format checking.

Figure 5:
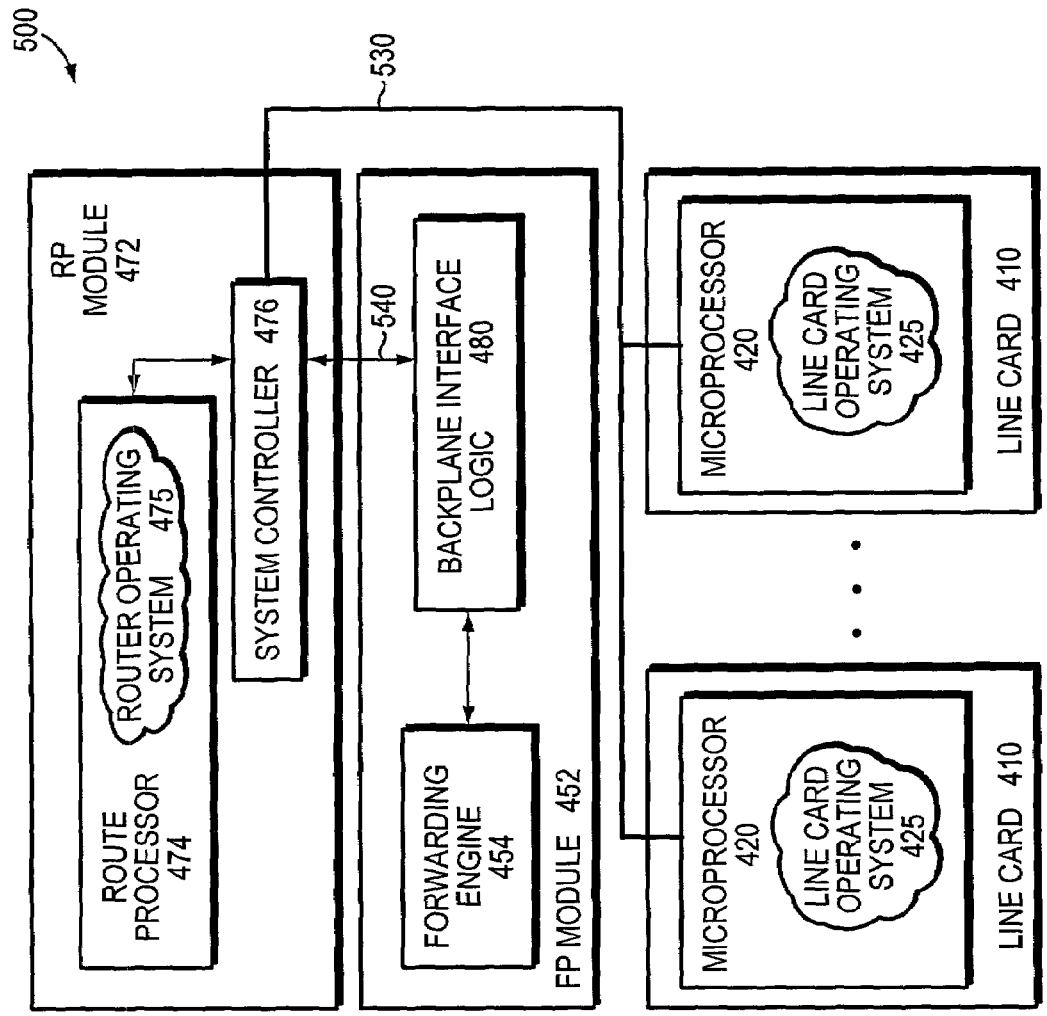
FIG. 5 is a schematic block diagram illustrating a functional infrastructure of the aggregation router of FIG. 4.

FIG. 5 is a schematic block diagram illustrating the functional infrastructure 500 of the aggregation router. A line card operating system 425 executes on microprocessors 420 of the line cards 410 and a network routing operating system 475 executes on the route processor 474 of the RP module 472. An example of a network routing operating system that may be advantageously used with the present invention is the Internetworking is Operating System (IOS®), whereas an example of a line card operating system is LC DOS, both of which are available from Cisco Systems Inc. LC DOS is a "light weight" operating system that is optimized for line card operation and that includes a built-in inter-processor communication (IPC) mechanism along with an on-line insertion and removal (OIR) mechanism configured to provide resiliency in a line card environment.

The line card operating system 425 provides maintenance functions for the hardware components of the line cards and communicates with the router operating system to exchange configuration information along with statistics reporting and event/alarm notification. General images of the line card operating system reside within the router operating system 475. When a new image of the router operating system is booted, a determination is made whether the version of the line card operating system executing on the line cards is the same as the current version residing on the router operating system. If not, the router operating system downloads the current image of the line card operating system to the line cards. The line card operating system is a "self loading" operating system in that each instance of the system that is running on the line cards includes a loader function that facilitates automatic, efficient downloading of images over a backplane Ethernet (BPE) connection 530 from the router operating system.

Broadly stated, the functional infrastructure of the aggregation router is divided into a data plane and a control plane. The data plane includes components used to retrieve data packets from the network and provide those packets to the PRE (and vice versa). To that end, the data plane extends from the ports 414, 418 on the line cards through the Barium ASICs over the interconnect system 440 to the Cobalt ASIC and ultimately to the forwarding engine 454 of the FP module 452. In contrast, the control plane includes those entities used to manage/control operation of the aggregation router and, to that end, extends from the microprocessors 420 on the line cards 410 over the BPE 530 to the route processor 474 on the RP module 472. Notably, the line card microprocessors 420 generally do not have access to the data plane in order to send information to the RP module through the FP module. Moreover, the data plane is used primarily for transporting data packets between the line cards and the PRE, although some control information (e.g., flow control) relating to control external to the aggregation router may flow over the data plane.

In sum, the infrastructure of the aggregation router includes distributed micro-processor entities resident on the line cards that perform local processing and interfacing to the physical port circuitry on the line cards, but that do not have direct access to the route processor over the data plane. The software architecture of the aggregator includes layering that provides separation between low-level functionality on the line cards (e.g., a specific interface chip, such as a channelized controller at the physical port circuitry) and high-level generic functions of the router operating system on the RP module. This separation layer of the software architecture provides a distinct interface between a generic software layer of the router operating system and the physical port interface layer of the router.

In the illustrative embodiment described herein, the separation layer comprises an application programming interface (API) layered or disposed over an IPC mechanism of the router operating system. The API layer performs a number of functions including, among other things, maintaining order among blocking and non-blocking messages issued by a line card driver (in the router operating system) to the physical ports on the line cards (in the interface functionality layer). The message aggregator invention described herein is generally directed to the relationship between the generic operating system software layer on the RP module and the physical port interface functionality layer on the line cards. In particular, the message aggregator invention provides an interface to a configuration layer of the router operating system that ensures configuration of a line card, such as a channelized T3 (CT3) line card, does not generate a message for every attribute of the CT3 line card. That is, the configuration layer interface keeps such messages to a manageable size.

Specifically, the message aggregation technique described herein enables reuse of existing (extant) procedural software code to generate object-based programming adapted to "feed" the line cards. That is, rather than sending an arbitrary number of commands to program the ports/interfaces (registers) on the line cards, the inventive technique limits the amount of information transported (i.e., "ported") to the line cards to the number of data objects to be programmed. A data object may be defined as widely or finely as desired; however, in the illustrative embodiment described herein using a CT3 line card, a data object is defined as a T3, a T1 or a channel.

Figure 6:
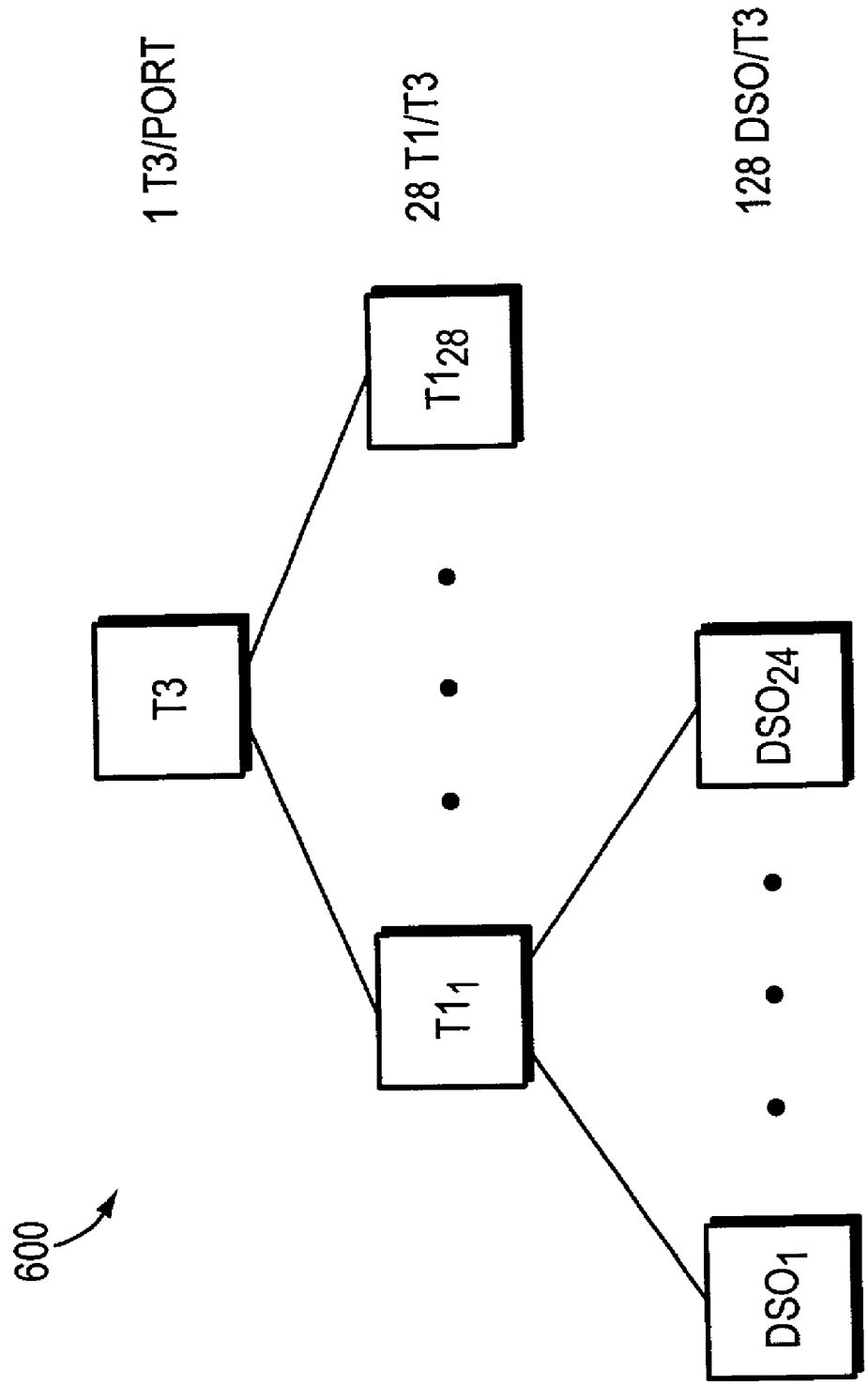
FIG. 6 is a schematic flow diagram illustrating a hierarchy of data types associated with each port of a line card, such as a channelized T3 line card that may advantageously used with the present invention.

More specifically, a CT3 line card includes 6 ports wherein each port represents a T3 data type. Each T3, in turn, has 28 associated T1s and each T1 has potentially 24 associated channels. FIG. 6 is a schematic flow diagram illustrating the hierarchy 600 of data types associated with each interface/port of a CT3 line card. In the illustrative embodiment, the aggregation router is limited by its hardware to 128 channels per T3 (or per port). Thus, there are 128 different channel objects associated with each T3 object. Accordingly, the novel technique limits the number of programming instructions sent by the route processor to the line cards (on a per port basis) to 1 T3, 28 T1s and 128 channels. The channels or DS0 time slots represent subscribers, each of which may have varying bandwidth up to the maximum bandwidth of the T1.

Using a command line interpreter (CLI), a user can program a number of parameters for the T3 connections, including internal/external clock settings and cable lengths. Similarly, the user can program various parameters at the levels of T1 and the channel time slots using the CLI. In the illustrative embodiment, the line card driver code is organized by the various parameters that can be programmed at each of these levels. The use of existing methods to download these parameters (i.e., commands) as individual messages would consume excessive bandwidth and processing resources of the router. The present invention is directed to a technique that limits the number of messages that is downloaded over the transport mechanism (e.g., the BPE 530) from the route processor to the line cards in order to program the interfaces on those line cards.

Specifically, the invention is directed to a technique used to limit the number of commands to a defined set of objects. The novel technique, called message aggregation, is configured to translate procedural programming code to object-based results. Typically, object-based results require high level object-based programming techniques; however, there is a body of extant procedural code that should be reused for economic purposes. The present invention enables reuse of this extant code by applying object-based programming principles to conventional procedural programming code. These principles result in the generation of data objects that are downloaded to the line cards. Thus, the technique described herein limits the number of hardware programming messages that is downloaded to the line cards from the route processor by aggregating those basic commands and organizing them into commands for the various defined data objects, which necessarily form a limited set.

According to an aspect of the present invention, the message aggregation technique utilizes an object programming paradigm that reduces the number of messages downloaded by focusing on the actual data objects being programmed, rather than the number of instructions downloaded from the route processor to the line cards. Each programming instruction is examined to determine whether it is a command directed to a T3 data object, a T1 data object or a DS0 channel data object. Thereafter, the instructions are grouped within their respective data object to thereby limit the number of commands to the number of data objects to be programmed. For example, the number of programming instructions for a particular port of the CT3 line card is limited to 1 T3, 28 T1 s and 128 channel data objects. Therefore, rather than sending a substantial number, e.g., thousands, of the fine granularity commands to a CT3 line card when programming one of its ports, the maximum amount of instructions sent is limited to 1 T3, 28 T1s and 128 DS0 channel objects.

Aggregation and organization of the commands into the defined data objects is performed as follows. In the case of a T3 data type of a CT3 line card, there is a plurality of individual atomic commands (e.g., change a particular parameter or manipulate a particular register) that exist in an extant code base adapted for various drivers. This extant procedural code base is converted into an object-based structure that operates on a T3 data type of line card. A single command message is generated that is directed to the T3 data object. This single command message "aggregates" any number of small atomic command messages that have been issued by the route processor and that affect the way the T3 operates.

Figure 7:
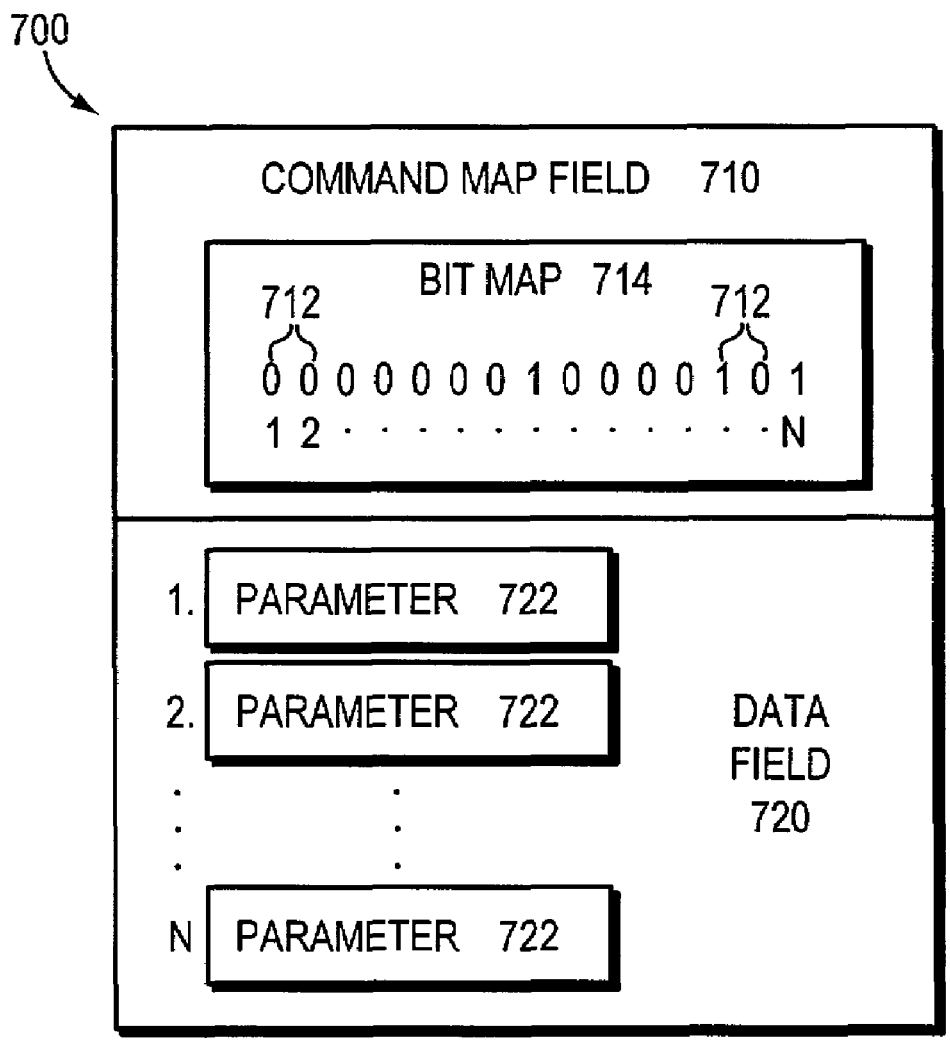
FIG. 7 is a schematic block diagram of the format of a command message in accordance with the present invention.

FIG. 7 is a schematic block diagram of the format of a command message 700 associated with a defined data object. The data object/message 700 includes a data field 720 comprising various data that configure the defined associated object, e.g., a T3. The various data are essentially parameters 722 used to configure the data type of a particular line card. All of the parameter data required to fully program the particular object to its current state are condensed into the data field 720. The command message 700 also includes a command map field 710 that comprises a bit map 714 having a plurality of bits 712, each of which corresponds to a particular action that has been taken. The action may, in turn, correspond to one or more of the data parameters 722 that have been sent to the programmed object. Generally, each bit 712 corresponds to a particular atomic command from the ported software that has been aggregated.

Notably, the map field 710 provides two services. First, the field 710 allows a programmer to efficiently communicate the atomic actions taken in an earlier procedural version of the ported code to the line card software. This allows the line card software to better interpret the scope of the action(s) that have been aggregated into the object message. Second, the field 710 provides an expediter for the line card code that obviates the need to scan all of the data parameters 722 in order to determine what atomic action has been taken. This latter service is particularly effective during execution of simple user-entered commands. As described herein, only those atomic actions taken against the particular object within a prior interval of aggregation are reflected in the map field; therefore, the map and data fields 710, 720 provide a complete set of information to the line card software. That is, these fields provide not only the total state of the object, but also a total set of atomic actions that have been aggregated into the single message.

According to the invention, a message aggregator entity is provided with the route processor to perform the function of aggregating and organizing commands within command messages associated with the data objects. The message aggregator is an additional level of code that sits between the CT3 driver and the IPC mechanism used to transport configuration commands from the route processor to the line card. Instead of line card commands being sent to the line card as they are invoked, the commands are aggregated by the message aggregator into a data structure whose contents reflect the information needed by the line card to correctly program itself. When a proper directive is given, these data (which comprise a current state of the hardware) are organized as a command message and sent to the line card on an object basis, with the principle objects being T3, T1, and DS0 channel objects. However a problem associated with a line card, such as the CT3 line card with its myriad interfaces, is scalability of data that passes through the IPC mechanism. The present invention addresses this scalability problem. Regardless of the number of individual low-level commands generated by high-level operations, the command set transmitted to the line card is dictated by the number of objects to be programmed (i.e., T3, T1, channels), not by the number of times a command is issued against an object.

Figure 8:
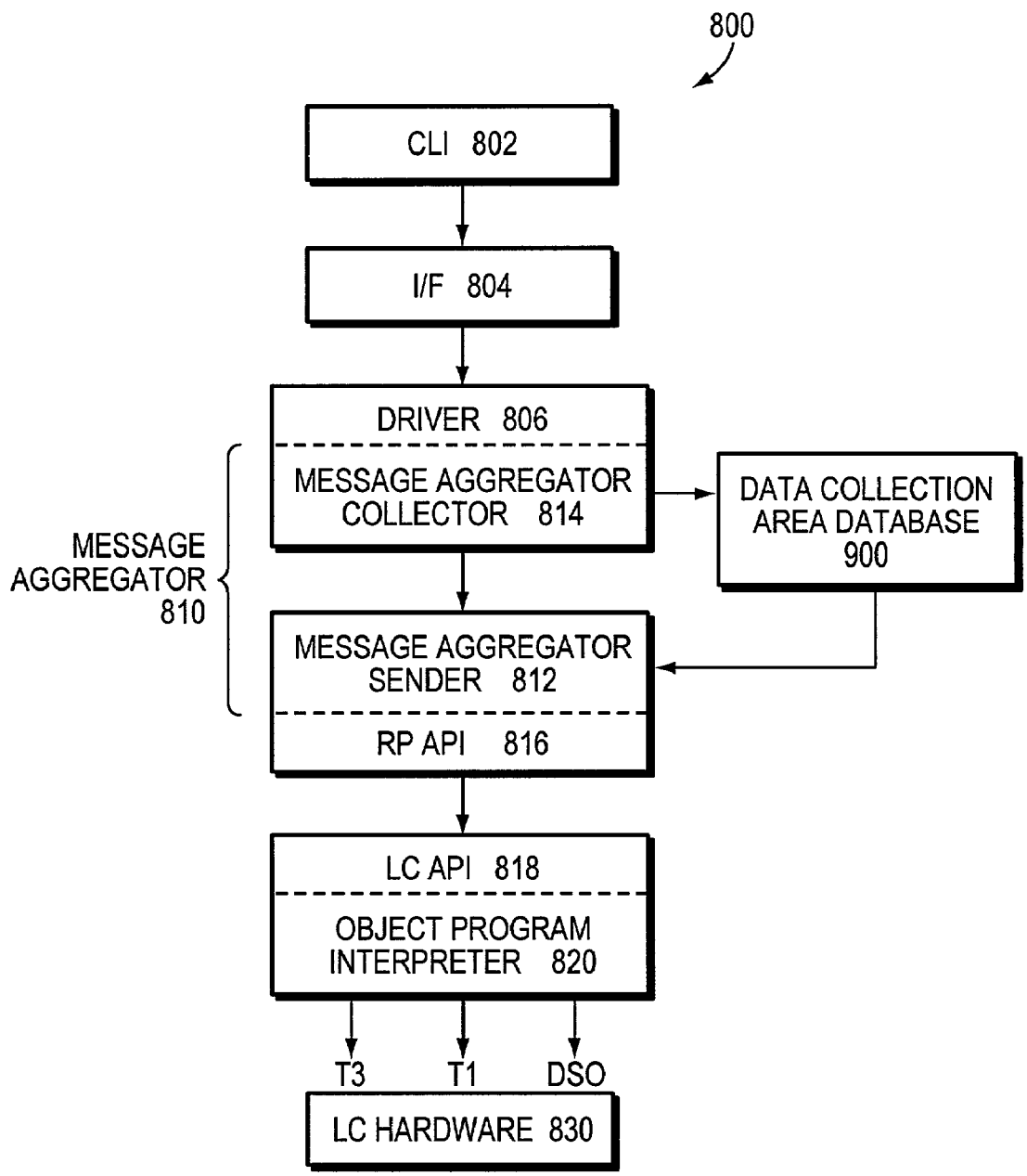
FIG. 8 is a flow diagram illustrating a software architecture of the aggregation router, including message aggregator in accordance with the present invention.

FIG. 8 is a flow diagram illustrating the software architecture 800 of the aggregation router and, in particular, entities associated with the RP module 472 and line cards 410 for programming the cards in accordance with the present invention. A CLI entity 802 of the router operating system 475 provides an interface for a user to enter a command to the router. The CLI command is processed by the CLI entity and forwarded to an interface (I/F) subsystem 804 of the operating system 475 that contains high-level code associated with the generic data types of the line card. That is, the I/F entity is a layer of code that handles channelized applications at a high level, independent of the specific line card. The I/F entity 804 apportions the command into a number of subroutines configured to service the data type, each of which is provided to a driver entity 806 that is specifically configured for the line card to be programmed. In essence, the I/F layer 804 is the platform-independent aspect of the router operating system, whereas the driver 806 represents the platform-specific layer of that system. For example, the I/F layer may perform a registry call for a particular CLI command and if that call has any meaning for the driver (i.e., specific physical interface), then the driver will respond to that particular call.

Each of the commands of the plurality of subroutines may be further apportioned into subroutines by the driver 806 (e.g., the CT3 driver) that are needed to service the line card. Moreover, any one of these latter subroutines may issue one or more basic commands via the IPC transport layer from the route processor to the line card to effect programming of the line card hardware. The flow diagram thus represents a "thread" used by the operating system to program a particular line card of the router. A single command issued by the user to the CLI entity 802 may spawn into many different commands that are actually sent to the line card for programming its hardware. As noted, the present invention is directed to reducing the number of messages containing programming instructions that are sent to the line cards. To that extent, the message aggregator function is provided to translate these programming instructions into a smaller number of data object command messages.

Figure 9:
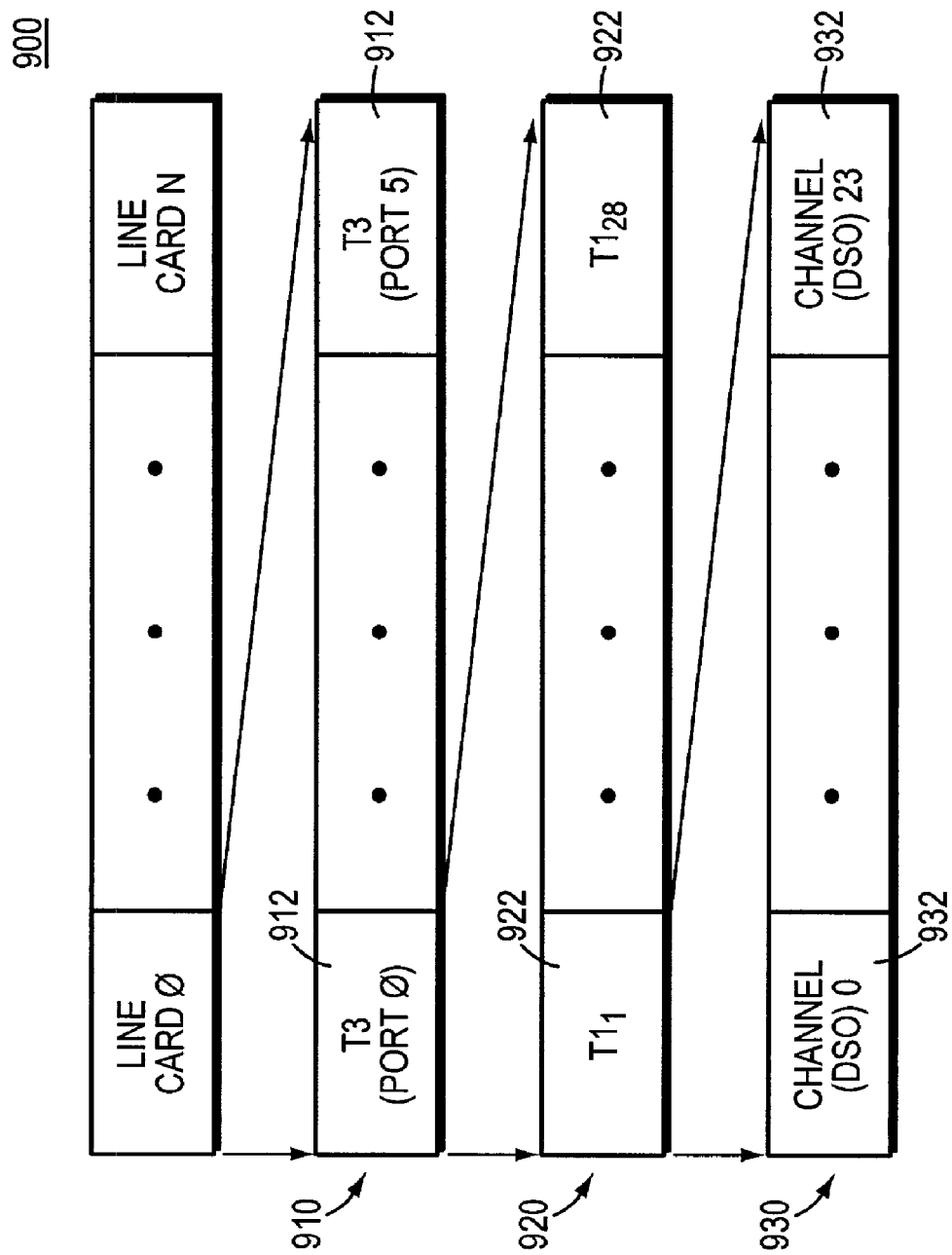
FIG. 9 is a schematic block diagram of a data collection area of the message aggregator in accordance with the present invention.

Translation of these discrete programming instructions into a command message associated with a data object is performed by an additional level of code 810 constituting the message aggregator. According to another aspect of the invention, the message aggregator 810 comprises a data collection area 900 that accumulates commands issued by a driver 806 to a particular line card 410. The data collection area 900 is preferably organized on the basis of a data object model defined for the line card and its data types. FIG. 9 is a schematic block diagram of the data collection area 900 that is preferably organized on a per line card basis. For each line card, there is a T3 area 910 with sufficient data object structures 912 to accommodate 6 T3 ports. In addition, there is a T1 area 920 with sufficient data object structures 922 to accommodate 28 T1s per T3 port and a channel area 930 with sufficient data structures 932 to support up to 128 channels per T3 port. The commands issued to the CLI interface 802 by a user are processed in a manner described above. However, rather than sending each command as an individual message to the line card, the driver 806 redirects the commands to the message aggregator 810 where they are aggregated into appropriate data object structures of the data collection area 900. Thereafter, the commands are formatted into command messages 700 for transfer over the IPC transport mechanism to the line card.

For example, assume the user issues a programming instruction directed to the T3 data type of a line card. That programming instruction is processed by the CLI entity 802 along with the I/F entity 804 and the proper driver 806 for the line card. Thereafter, the instruction is directed to the data collection area 900 where the parameters associated with the programming instruction are loaded into the T3 data object 912 (which is subsequently transformed into a command object message 700). The parameters specified by the driver programming instruction are updated in their respective parameter entries 722 of the data field 720 of the data object/message, as appropriate bits 712 of the bit map 714 within the command map field 710 are asserted to denote those parameters that have been updated. As noted, the entire state of that particular data type is included within the data field of the data object, whether or not certain parameters associated with that state have been updated. The state of the bit map within the command map field indicates which of those parameters 722 have been updated.

In the illustrative embodiment, aggregation of instructions/commands into data objects occurs constantly within a predefined time period, e.g., 3 seconds. During this time interval, a sender function 812 of the message aggregator 810 determines whether any of the data object areas have been modified by, e.g., examining flags within the data collection area. If so, the message aggregator sender 812 formats the modified data object into a command message 700 for transport over the IPC mechanism to the line card. After the message aggregator sender 812 formats and sends the data object command message to the line card, it clears that data object within the data collection area (data-base) 900 to essentially initialize it for use by subsequent programming instructions.

A collector function 814 of the message aggregator 810 creates the data object message structures defined for the data types of the line cards and organizes them into the data collection database 900. The message aggregator collector 814 and sender 812 are processes executing on the route processor 474. The collector process executes "library style" from the line card specific driver 806 and is essentially a part of the driver that adds to its functionality. That is, a library of calls is made available to the driver to invoke the collector 814 when creating the data objects and organizing them into the data collection area database 900.

On the hand, the command aggregator sender process 812 executes independently on the route processor 474 to search for changes in the data object states and, upon finding such changes, sending the data objects as messages to the line card. The sender process actually searches for bits asserted within the bit map 714 of the command map field 710 of each data object to determine whether any changes have occurred. Note that the collector process asserts those bits within the bit map when creating the data object/message and loading the data field 720 of the message with parameters 722 that up-date the data object in response to instructions issued by the driver 806. The inventive message aggregation technique thus improves the performance of the system by reducing the overhead that would typically be consumed when issuing individual programming instructions from the driver to the line card.

In an embodiment of the present invention, a data structure that comprises all possible chassis-wide programming data for the CT3 line card is constructed from data types defined by an API. The structure begins a command sequence in a cleared condition. As various commands are issued and aggregated within the structure for the proper objects, "cataloguing" markers are kept to denote which objects of the many included have indeed been programmed; this expedites the sending process. When a directive to stop aggregation and send all accumulated data is given, a hierarchical table (formatted as shown in FIG. 9) is searched in hierarchical order. Searching is performed one slot (card) at a time. Within that ordering, programming data for objects that have been programmed are collected and dispatched to the line card in the following order: (1) all T3 data for the card, (2) all T1 data for the card, and (3) all channel data for the card.

For example, assume data has been generated for 2 T3s, 33 T1s and 128 channels of a line card. Three basic messages are then sent to the line card: (1) a "for-T3" message containing two T3 data objects, (2) a "for-T1" message containing 33 T1 data objects, and (3) a "for-channels" message containing 128 channel data objects. Each object contained in a larger IPC message has its own indexing information as part of its data; the only datum of interest to the generic API is the slot (card) number. If a message is too large for the IPC mechanism, it is fragmented into as many contiguous messages as needed. For example, the "for-channels" message described above may actually be sent as 3 or 4 contiguous messages to the line card.

In accordance with the present invention, the methodology defined by the novel message aggregation technique is as follows:
 (1) as typical command sequences employing parameter instructions for the novel message aggregator occur in higher-level code, line card programming data are collected instead of individual messages being transmitted;
 (2) when the aggregator's sending action is triggered, either by the completion of full startup procedures of a line card or, during normal operation, by the sending process is that periodically triggers line card programming if any new object data are found to have been collected during step (1), the message aggregator:
  (a) "walks" through its data collection area structures ordinally and, for each data object found to be programmed during the session, packs that object into a proper "to-be-sent" queue, depending upon the type of object (e.g., T3, T1 or channel);
  (b) for each object type queue (and continuing until the contents of the queue are exhausted), the aggregator packs IPC messages with as many individual data objects as will fit within their maximum size and sends the messages; and
  (c) the aggregator performs "clean-up" duties, clearing the object database in preparation for the next aggregation interval to occur.

In the illustrative embodiment, the message aggregator is self-contained within a single software module. It should be noted that routines that replace line card programming calls in earlier (and reused) code and which simply aggregates programming data into the message aggregator's data structures are provided as external routines to the pertinent driver and are coupled to that driver's data by necessity. Preferably, there are two specific types of external routines ("calls") adapted for use with the message aggregator. A first type relies on data structures known within the scope of the driver and is intended for use within that scope. An example of this first type is a command to set cable length on a specific T3, given within the driver and relying on driver structures to properly index the T3. This type of command is a "hook" into the driver code that typically replaces the earlier atomic programming call. The command also results only in the setting of a bit 712 within the command map field 710 of the particular object within the aggregator database, and the updating of its parametric data 722 within the database. A second type of external call is also used within the driver to trigger the sending mechanism to the line card in the special case of line card startup/initialization. Other than these, no external calls from the aggregator module are necessary. The periodic sending process that occurs during normal system operation is defined within the scope of the aggregator module and thus requires no external calls.

According to another aspect of the present invention, ordering of programming instructions is maintained by the structure and format of the command message that is transmitted to the line card, as well as the manner in which the line card processes the command message. That is, the line card software examines and processes the contents of the command messages according to the hierarchical programming order defined by the data collection area database. For example, the line card software processes the first line card slot (line card 0) and, within that line card, processes the T3 data objects, followed by the T1 data objects and then the channel objects. The line card software configured to receive the command messages 700 is preferably an object program interpreter 820. Notably, both the sender process 812 and the object program interpreter 820 include API layers (RP API 816 and LC API 818) that cooperate to provide a standard messaging system adapted for operation with the IPC transport mechanism.

The API is preferably structured in accordance with object programming operation as described herein. For example, actual generic-API command "types" become object identifiers for the CT3 line card, i.e., "this is for the T3 on port 2 of card 4". As noted, normal procedural commands, e.g., "set cable length for the T3 on port 2 of card 4", are assimilated as command parameters denoted by a bit map associated with the T3 data object. That is, an API header of the command message specifies "a T3 level message" having the structure of a T3 data object. The data contained within the data object then denotes the particular T3 port on the particular line card.

In addition to organizing the programming instructions into data objects, the message aggregator also "packs" the discrete data type objects into the largest command message format that is supported by the IPC transport mechanism. That is, instead of sending, e.g., 20 separate T3 commands as individual messages to the line card, the message aggregator provides an additional level of aggregation to consolidate those discrete messages into one large IPC message transfer. In the illustrative embodiment described herein, the largest transfer size, i.e., the maximum transfer unit (MTU), is preferably 1420 bytes.

Specifically, the message aggregator starts at the first card slot (card 0) and the first port on that card (port 0) and works it way through all of the ports on the line card, determining which data objects have changed. Those data objects that have modified parameters are then packed into a single IPC message structure (assuming that they are less than or equal to 1420 bytes). This packed structure is forwarded as a single message transfer over the IPC mechanism to the line card. The object program interpreter 820 of the line card decomposes the IPC message into its individual data objects by first determining the data type associated with the command message and then the number of data objects included within that message. The interpreter then programs the line card hardware 830 according to the hierarchical order defined by the data collection area database 900.

The complementary line card interpreter code 820 is constructed to program various objects by their final states, instead of processing a substantial number (e.g., hundreds) of individual commands. This is advantageous since many of these latter commands are likely repetitive, owing to the structure of the extant driver code and the nature of its expansion via reuse of existing modules. Furthermore, in order to ensure smooth transition during initial implementation, individual commands can be subsumed within the data package that is forwarded to the particular object interface, leaving pure "programming-by-object-and-state" as a next step. These procedures expedite development in two ways; first by permitting developers on the main processor to reuse extant operating system code developed for similar applications and, secondly, by allowing line card programmers to leverage extant code designed to handle individually-sent parameter changes.

Each data object includes information that identifies the data type of that particular object. The command type included in the API (IPC) header informs the line card whether the transmitted information is directed to a T3, a T1 or a channel object. However, the information contained in the IPC header is inadequate for resolution of a channelized T3 and further data is needed to identify the T3/T1/channel interface. That information is subsumed within respective parameter (subcommand) data. The header also includes variable-length protocol information that defines the number of data parameters contained within the structure.

In the illustrative embodiment, the granularity of aggregation within the command structure MTU is a T3, T1 or channel. This type of aggregation, in turn, limits the number of messages sent to the line card to (i) the number of objects, and (ii) the largest, most efficient transfer size supported by the IPC mechanism. If the packed message is too large for the IPC mechanism, it is fragmented into as many contiguous messages as needed to accommodate all of the discrete data objects. Advantageously, the number of messages sent to the line card is reduced by making the messages as large as possible. As noted, the command aggregator sender process is the entity that packs the discrete data objects into the large message structure.

Order is maintained within the packed message and, in fact, among all the messages by sending all T3 message command structures first, followed by all T1 command messages and then all channel command messages. Moreover, within a packed command structure, the order of the data objects associated with the particular data type is maintained by starting with the lowest number data type (e.g., port 0 or channel number 0) and proceeding in order to the highest number. Once the command messages are received at the object program interpreter 820, that line card software utilizes those messages and, in particular, the parameters contained therein to program the actual line card hardware 830 (e.g., registers). At every 3 second interval, the command aggregator sender 812 preferably scans the entire data collection area database 900 searching for data objects that have been modified and formats all of those modified data structures for transmission to the line card. It should be noted that the maximum message transfer size need not be satisfied for each transfer to the line card. However, it is desirable to optimize transfers to the line card and, as a result, the MTU (as defined by the IPC mechanism) should be realized.

Given the need to utilize platform-independent, "extant" procedural code of the router operating system, programming support of a line card having various parameters associated with its physical interfaces using conventional methods is inefficient. In order to reuse this body of proven extant code with line cards having large-scale channelized interfaces, the present invention provides a means for generating data objects from such procedural code. This, in turn, limits the number of messages transported from the route processor to the interfaces when programming those channelized interfaces. The present invention thus aggregates programming instructions associated with that procedural code into data objects for transmission to the line card. Accordingly, the message aggregator functions as a procedure-to-object translator that translates procedural code into parameters of data objects that are then efficiently distributed to the appropriate line cards. The message aggregation technique can be used in any application that requires interface scaling, such as a channelized OC-12 line card used in an aggregation router.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for converting procedural instructions to object-based format for efficient transfer from a route processor to a line card of an intermediate node, the method comprising the steps of:
   processing the procedural instructions at the route processor, the procedural instructions adapted to program a predetermined interface on the line card;
   aggregating the programming instructions into a data object at the route processor;
   organizing the aggregated data object instructions into a single message; and
   transferring the message over a communications medium to the line card.

2. The method of claim 1 wherein the step of aggregating comprises the step of translating procedural instructions into parameters of the data object.

3. The method of claim 2 wherein the step of aggregating further comprises the steps of:
   condensing the parameters into a data field of the data object; and
   providing a map field of the data object, the map field having a plurality of bits corresponding to one or more of the parameters.

4. The method of claim 3 wherein the step of organizing comprises the step of gathering the parameters into a maximum size message.

5. The method of claim 4 wherein the maximum size message is adapted to an inter-process communication mechanism of the intermediate node.

6. A system adapted to convert procedural instructions to object-based format for efficient transfer within an intermediate node of a computer network, the system comprising:
   at least one line card of the node, the line card having a plurality of interfaces for receiving subscriber traffic from the computer network;
   a route processor coupled to the line card and configured to process the procedural instructions, the procedural instructions configured to program a predetermined interface on the line card;
   a message aggregator configured to aggregate the instructions into a data object at the route processor, the message aggregator translating the instructions into commands that are organized as a message; and
   a communications medium of the node, the communications medium configured to transport the message to the line card.

7. The system of claim 6 wherein the intermediate node is a router.

8. The system of claim 6 wherein the intermediate node is an aggregation router.

9. The system of claim 6 wherein the at least one line card is a channelized T3 line card.

10. The system of claim 6 wherein the communications medium is a backplane Ethernet connection.

11. The system of claim 6 wherein the message aggregator comprises a sender configured to format the data object into the message for transport over the communications medium to the line card.

12. The system of claim 6 wherein the message aggregator comprises a data collection area that accumulates the commands, the data collection area organized as data object structures defined for the line card and data types associated with the interfaces.

13. The system of claim 12 wherein the message aggregator further comprises a collector configured to create the data object structures and organizes the structures into the data collection area.

14. Apparatus for converting procedural instructions to object-based format for efficient transfer from a route processor to a line card of an intermediate node, the apparatus comprising:
   means for processing the procedural instructions, the procedural instructions adapted to program a predetermined interface on the line card;
   means for aggregating the programming instructions into a data object;
   means for organizing the aggregated data object instructions into a single message; and
   means for transferring the message over a communications medium to the line card.

15. The apparatus of claim 14 wherein the means for aggregating comprises means for translating procedural instructions into parameters of the data object.

16. The apparatus of claim 15 wherein the means for aggregating further comprises:
   means for condensing the parameters into a data field of the data object; and
   means for providing a map field of the data object, the map field having a plurality of bits corresponding to one or more of the parameters.

17. The apparatus of claim 16 wherein the means for organizing comprises means for gathering the parameters into a maximum size message.

18. A computer readable medium containing executable program instructions for converting procedural instructions to object-based format for efficient transfer from a route processor to a line card of an intermediate node, the executable program instructions comprising program instructions for:
   processing the procedural instructions at the route processor, the procedural instructions adapted to program a predetermined interface on the line card;
   aggregating the programming instructions into a data object at the route processor;
   organizing the aggregated data object instructions into a single message; and
   transferring the message over a communications medium to the line card.

19. The computer readable medium of claim 18 wherein the program instruction for aggregating comprises a program instruction for translating procedural instructions into parameters of the data object.

20. The computer readable medium of claim 19 wherein the program instruction for aggregating further comprises program instructions for:
   condensing the parameters into a data field of the data object; and
   providing a map field of the data object, the map field having a plurality of bits corresponding to one or more of the parameters.

21. The computer readable medium of claim 20 wherein the program instruction for organizing comprises a program instruction for gathering the parameters into a maximum size message.

* * * * *